US008392108B2

(12) United States Patent
Meyer et al.

(10) Patent No.: US 8,392,108 B2
(45) Date of Patent: Mar. 5, 2013

(54) APPARATUS AND METHOD FOR ALLOCATING A CURRENT MEASUREMENT VALUE FOR A GEOGRAPHICAL POSITION TO A MAP OBJECT

(75) Inventors: Steffen Meyer, Erlangen (DE); Juergen Hupp, Nuremberg (DE); Stephan Haimerl, Seubersdorf (DE); Renata Kitti Zahonyi, London (GB)

(73) Assignee: Fraunhofer-Gesellschaft zur Foerderung der Angewandten Forschung e.V., Munich (DE)

( * ) Notice: Subject to any disclaimer, the term of this patent is extended or adjusted under 35 U.S.C. 154(b) by 36 days.

(21) Appl. No.: 12/972,567

(22) Filed: Dec. 20, 2010

(65) Prior Publication Data
US 2011/0153632 A1    Jun. 23, 2011

Related U.S. Application Data

(63) Continuation of application No. PCT/EP2009/004524, filed on Jun. 23, 2009.

(30) Foreign Application Priority Data
Jun. 27, 2008   (DE) .................... 10 2008 030 504

(51) Int. Cl.
G01C 21/00    (2006.01)
(52) U.S. Cl. .......... 701/409; 701/445; 701/446; 367/21; 367/38; 367/128; 342/351; 342/463
(58) Field of Classification Search .......... 701/445–446; 367/21, 38, 128; 342/351, 463
See application file for complete search history.

(56) References Cited

U.S. PATENT DOCUMENTS

| 6,023,653 | A | 2/2000 | Ichimura et al. |
| 6,525,688 | B2 | 2/2003 | Chou et al. |
| 2003/0014286 | A1* | 1/2003 | Cappellini ........................ 705/5 |
| 2004/0131125 | A1* | 7/2004 | Sanderford et al. .......... 375/261 |
| 2004/0192189 | A1* | 9/2004 | Yuhara et al. ................. 455/3.02 |
| 2007/0071114 | A1* | 3/2007 | Sanderford et al. .......... 375/259 |
| 2008/0176510 | A1* | 7/2008 | Yuhara et al. ................. 455/3.02 |
| 2008/0177465 | A1* | 7/2008 | Barber et al. ................. 701/206 |
| 2009/0054074 | A1* | 2/2009 | Aaron ........................ 455/452.2 |
| 2009/0286549 | A1* | 11/2009 | Canon et al. ............... 455/456.1 |

FOREIGN PATENT DOCUMENTS

| CN | 1416530 A | 5/2003 |
| CN | 101131432 A | 2/2008 |

(Continued)

OTHER PUBLICATIONS

English translation of Official Communication issued in corresponding International Patent Application No. PCT/EP2009/004524, mailed on Mar. 10, 2011.

(Continued)

Primary Examiner — Hanh Thai
(74) Attorney, Agent, or Firm — Keating & Bennett, LLP

(57) ABSTRACT

An apparatus for allocating a current measurement value for a geographical position to a map object of a geographical map, wherein the current measurement value originates from a series of adjacent measurement values for adjacent geographical positions, having a processor for determining a first probability measure indicating whether the current measurement value can be allocated to a first map object to which at least one adjacent measurement value of the series has already been allocated previously, and for determining a second probability measure indicating whether the current measurement value can be allocated to a second map object having an intersection with the first map object, if the first probability measure indicates that an allocation of the current measurement value to the first map object is unlikely.

7 Claims, 8 Drawing Sheets

FOREIGN PATENT DOCUMENTS

| | | |
|---|---|---|
| EP | 1 022 578 A2 | 7/2000 |
| KR | 10-0366326 B1 | 12/2002 |

OTHER PUBLICATIONS

Bahl et al., "RADAR: An In-Building RF-based User Location and Tracking System", INFOCOM 2000 Nineteenth Annual Joint Conference of the IEEE Computer and Communications Societies, Mar. 26, 2000, pp. 775-784.

Official Communication issued in corresponding Korean Patent Application No. 10-2010-7029379, mailed on May 4, 2012.

* cited by examiner

APPARATUS AND METHOD FOR ALLOCATING A CURRENT MEASUREMENT VALUE FOR A GEOGRAPHICAL POSITION TO A MAP OBJECT

CROSS-REFERENCE TO RELATED APPLICATIONS

This application is a continuation of copending International Application No. PCT/EP/2009/004524, filed Jun. 23, 2009, which is incorporated herein by reference in its entirety, and additionally claims priority from German Application No. 102008030504.9, filed Jun. 27, 2008, which is incorporated herein by reference in its entirety.

BACKGROUND OF THE INVENTION

The present invention relates to a concept for allocating geographical position measurement values to geographical maps or objects of such maps, as can be used, for example, for improving the accuracy of such position measurement values.

When determining measurement values for respective geographical positions interval by interval while driving or walking through roads or paths, more or less great inaccuracies result, depending on the method used. The currently most widespread navigation system is the global positioning system (GPS). Since artificial signal distortion was abandoned several years ago, locating accuracies of 10 to 15 meters can be obtained with little effort. Thereby, the locating accuracy depends also on the number of satellites that are "seen" at the measurement time. Generally, it can be said that the measurement accuracy increases with the number of received satellites.

If, however, one is moving in an urban area with partly highly built-up roads or narrow alleys, it can happen that buildings shade a line of sight to satellites, and hence the measurement accuracy achievable by GPS decreases. If geographical raw data measured by a satellite position determination system are placed into geographical town maps or maps, relatively implausible location indications can result that have only little in common with the actual geographical position of the navigation device. This applies in particular for narrow alleys and footpaths where even an accuracy of 10 to 15 meters can result in implausible results. In particular at crossroads it can be difficult to decide which road an inaccurately measured point is to be allocated to.

Thus, frequently, geographic raw data measured by navigation systems are matched to map data, so that, for example, a driver receives plausible position information on the display of the navigation device his vehicle. If the accuracy of the position determination is currently at approx. 50 meters, for example, and if a driver is moving along a road at the side of a lake, it would be very confusing if the position of the vehicle on the display of the navigation device were not indicated on the road but in the lake—even if the raw measurement values provide a (wrong) position in the lake. In such cases, a navigation system detects that such a position is extremely unlikely for applications in a road navigation system and corrects the measured geographical position for display in the geographical map such that the same corresponds to a plausible position, for example on a road.

Due to the increasing distribution of wireless radio networks, for example based on the WLAN standard (Wireless Local Area Network), these wireless networks offer themselves as a basis for new localization methods. In WLAN-based locating systems, frequently a so-called received signal strength (RSS) fingerprinting is used as a basic method. This method is based on the assumption that the signal strengths of radio signals of several radio stations received or receivable at a current location unambiguously characterize the current location or the current geographical position. If a reference database exists which contains, for a number of geographical reference locations or reference positions, the transmitter identifications of radio stations received or receivable there at reference times, as well as the signal strengths of the corresponding radio signals, the current position can be inferred from a set of current measurement values (transmitter identifications and associated signal strength values) by matching the currently measured measurement values and the reference values of the database. This matching evaluates for every reference point how similar its previously recorded measurement values or reference values are to the current measurement values of the current position. The most similar reference point(s) is/are used as a basis for an estimated value for the current position of the mobile terminal device.

From this, it is obvious that the accuracy of such WLAN-based localization systems depends among others on the quality of the reference positions in the reference database. The signal strength of a radio transmitter receivable at a reference position at a reference measurement time is determined experimentally for a reference database by a reference measurement. This results in a database containing a list of radio transmitters (access points) including the respective associated received field strength and quality for every reference position where a reference measurement has been performed. Thereby, the reference positions are determined, for example, by GPS devices. The accuracy of such measurements has already been discussed above.

SUMMARY

According to an embodiment, an apparatus for improving reference data stored in a reference data base, having measured coordinates of a geographical reference position and a reference measurement packet allocated to the reference position, which has a reference transmitter identification determined at the geographical reference position and an electromagnetic signal characteristic of a radio transmitter receivable at the reference position at a reference time, may have: a processor implemented to match the measured coordinates approximating actual coordinates of the geographical reference position to coordinates of map objects of a geographical map to obtain improved coordinates corresponding better to the actual coordinates of the geographical reference position than the measured coordinates, and to replace, in the reference measurement packet stored in the reference data base, the measured coordinates of the geographical reference position by the improved coordinates.

According to another embodiment, a method for improving reference data stored in a reference data base, having measured coordinates of a geographical reference position and a reference measurement packet allocated to the reference position, which has a reference transmitter identification determined at the geographical reference position and an electromagnetic signal characteristic of a radio transmitter receivable at the reference position at a reference time, may have the steps of: matching the measured coordinates approximating actual coordinates of the geographical reference position to coordinates of map objects of a geographical map to obtain improved coordinates corresponding better to the actual coordinates of the geographical reference position than the measured coordinates; and replacing the measured coordinates of the geographical reference position by the improved coordinates in the reference measurement packet stored in the reference data base.

Another embodiment may have a computer program for performing the inventive method when the computer program runs on a computer or a microcontroller.

It is the finding of the present invention that for matching measured position values to (digital) map data or map objects, such as roads or paths, probability measures are introduced to be able to detect from the inaccurate raw measurement values when, for example, a change from a first road to a second road takes place. The roads represent map objects. Obviously, exact geographic coordinates exist for the map objects. If a geographical position raw measurement value is allocated to a map object according to the inventive concept, this means generally also an upvaluation of the position raw measurement value, to the effect that its accuracy is improved. Hence, after that, for WLAN-based locating, the improved position measurement value is significantly more valuable as reference position of a reference measurement packet.

A change of a currently considered measurement point at least two last measurement points is entered, for example, into the determination of the probability measures. More accurately, for example, a deviation of the currently considered measurement point from a (best-fit) line is considered, which is placed through the at least two last measurement points already allocated to a map object. Thereby, the at least two last allocated measurement points represent measurement points allocated to a map object, such as a road, a path or a building.

Further, a distance of the currently considered position measurement value to the considered map object, such as a road, is also entered into the determination of the probability measure.

Since it is questionable whether the currently considered measurement value is to be allocated to a first map object (e.g. road) or a second map object (e.g. intersecting road), a distance of the current measurement value to a next possible intersection (e.g. crossroads) of the first map object with the second map object is also entered into the determination of the probability measure.

For this, embodiments of the present invention provide an apparatus for allocating a current measurement value for a geographical position to a map object of a geographical map, wherein the current measurement value originates from a series of adjacent measurement values for adjacent geographical positions, comprising a processor for determining a first probability measure indicating whether the current measurement value can be allocated to a first map object to which at least one adjacent measurement value of the series has already been allocated previously, and for determining a second probability measure indicating whether the current measurement value can be allocated to a second map object having an intersection with the first map object, if the first probability measure indicates that an allocation of the current measurement value to the first map object is unlikely.

Thereby, measurement points can be allocated to different map objects. In the outdoor area, for example roads, squares, alleys, and in the indoor area corridors, rooms, floors, walls, etc. are modeled as polygons consisting of sectionally defined lines. This means that all map objects comprise again at least sectionally line-shaped map objects.

Further, embodiments of the present invention provide an apparatus for improving reference data having measured coordinates of a geographical reference position and a reference measurement packet allocated to the reference position, which has a reference transmitter identification determined at the geographical reference position and an electromagnetic signal characteristic of a radio transmitter receivable at the reference position at a reference time, comprising a processor for matching the measured coordinates approximating actual coordinates of the geographical reference position to coordinates of map objects of a geographical map to obtain improved coordinates corresponding better to the actual coordinates of the geographical reference position than the measured coordinates and to allocate the improved coordinates to the reference measurement packet.

Thus, embodiments of the present invention allow an allocation of geographical raw measurement values measured, for example, with a GPS system, to map objects of a digital map, wherein the map objects are again provided with exact position information. Thus, the inaccurate raw measurement values can be corrected and measurement errors can be compensated. The corrected measurement values can then, for example, be used as reference positions for a database already described above for WLAN-based localization or navigation systems.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
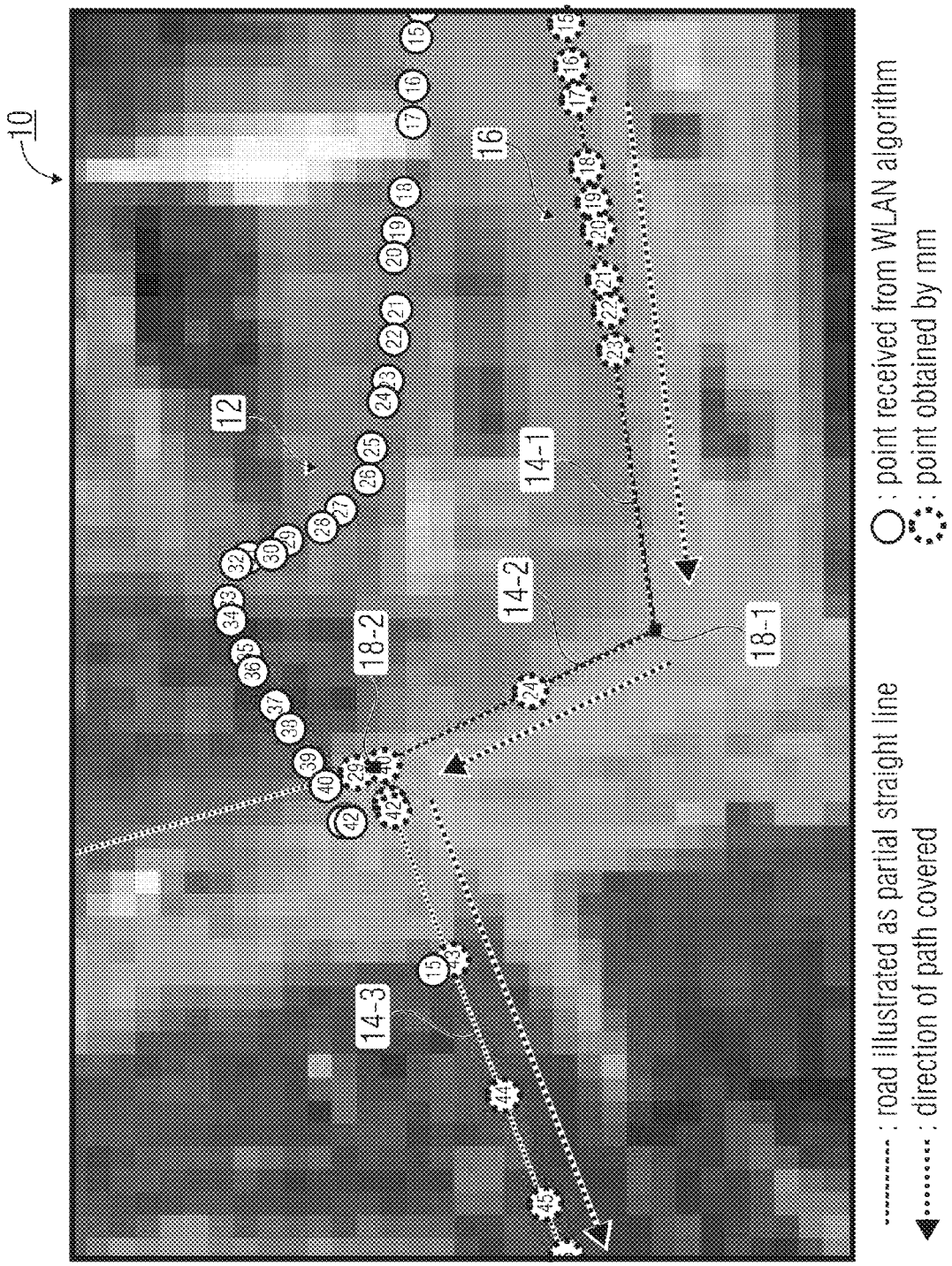
FIG. 1 is an apparatus for allocating a current measurement value for a geographical position to a map object according to an embodiment of the present invention.

FIG. 1 shows a (greatly enlarged) area of a digital map 10.

A series of adjacent raw measurement values 12 for geographical positions are shown in the map 10. These measurement values 12 have been determined along a route that has actually been walked, indicated in FIG. 1 by the dotted arrows. The measurement values 12 have, therefore, actually been recorded along road sections illustrated in the map 10 as sectionally line-shaped map objects 14. The road sections intersect at intersections 18-1, 18-2. It can be clearly seen that the measured positions 12 correspond only very inaccurately to the actual geographical positions that are, after all, on the road sections 14. Hence, for different applications, it is necessitated to allocate each of the measured points 12 to a respectively correct road 14-1, 14-2 or 14-3.

If, in an obvious manner, perpendicular projection were performed regarding a shortest distance of a measurement point to the respective road, only a very inadequate matching result would be obtained, as is illustrated by the projected points 16 on the at least sectionally line-shaped map objects 14-1, 14-2 and 14-3.

Thus, according to embodiments of the present invention, rules are laid down for respective allocating of the correct map objects 14 to the measurement points 12, as will be described in more detail below based on FIGS. 2-8.

Figure 2:
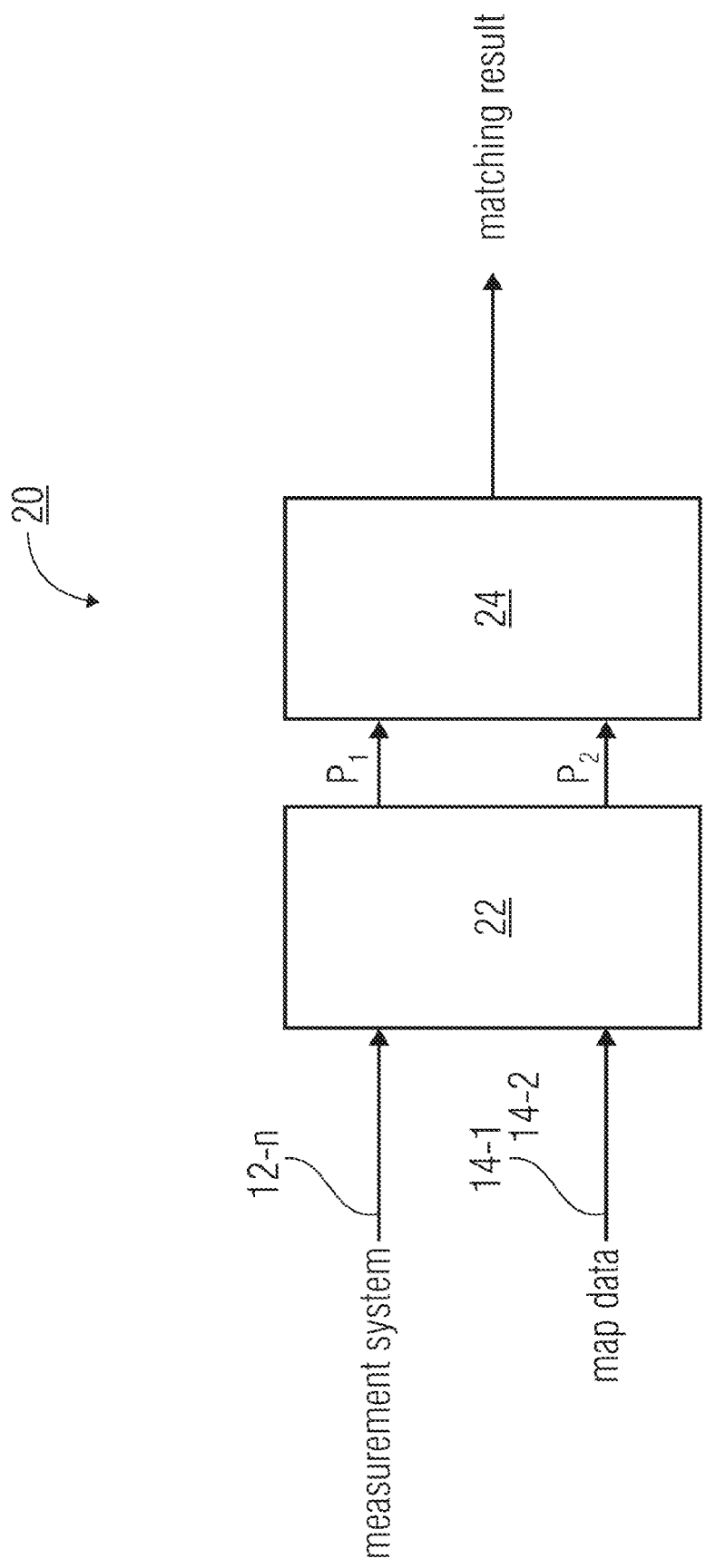
FIG. 2 is a method for allocating a current measurement value according to an embodiment of the present invention.

FIG. 2 schematically shows a block diagram of an apparatus 20 for allocating a current measurement value 12-$n$ for a geographical position to a map object 14 of a geographical map, wherein the current measurement value 12-$n$ originates from a series of adjacent measurement values 12-1, ..., 12-N for adjacent geographical positions, i.e. n=1, 2, ..., N. Therefore, the index n virtually means allocation times.

The apparatus 20 comprises a processor 22 for determining a first probability measure $P_1$ indicating whether the current measurement value 12-$n$ can be allocated to a first, at least sectionally line-shaped map object 14-1, to which at least one adjacent or previous measurement value 12-1, ..., 12-$(n-1)$ of the series has been allocated previously. Further, the processor 22 serves for determining a second probability measure $P_2$ indicating whether the current measurement value 12-$n$ can be allocated to a second, at least sectionally line-shaped map object having an intersection 18 with the first map object 14-1, if the first probability measure $P_1$ indicates that an allocation of the current measurement value 12-$n$ to the first map object 14-1 is unlikely.

The first probability measure $P_1$, which is allocated to the first map object 14-1, indicates how likely it is that the current measurement point 12-$n$ can actually be allocated to the first map object 14-1 (e.g. a first road). The second probability measure $P_2$ is allocated to the second map object 14-2, i.e. for example a second road, and indicates how likely it is that the current measurement point 12-$n$ can be allocated to this second map object 14-2. Thus, embodiments of the present invention can be used for determining, at critical positions such as crossroads, whether a change of route (e.g. change of roads) has been made and, if so, in which direction. For this, according to the invention, rules are laid down for determining the first and/or second probability measures $P_1$, $P_2$. $P_1$ and $P_2$ can then be supplied to a selection means 24 that ultimately selects, based on the probability measures $P_1$ and $P_2$, a map object to which the current measurement point 12-$n$ is allocated.

First, the determination of the first probability measure $P_1$ will be elucidated in more detail.

According to embodiments of the present invention, for determining the first probability measure $P_1$, different partial probability measures or allocation probabilities are determined that are then combined to the probability measure $P_1$.

Figure 3A:
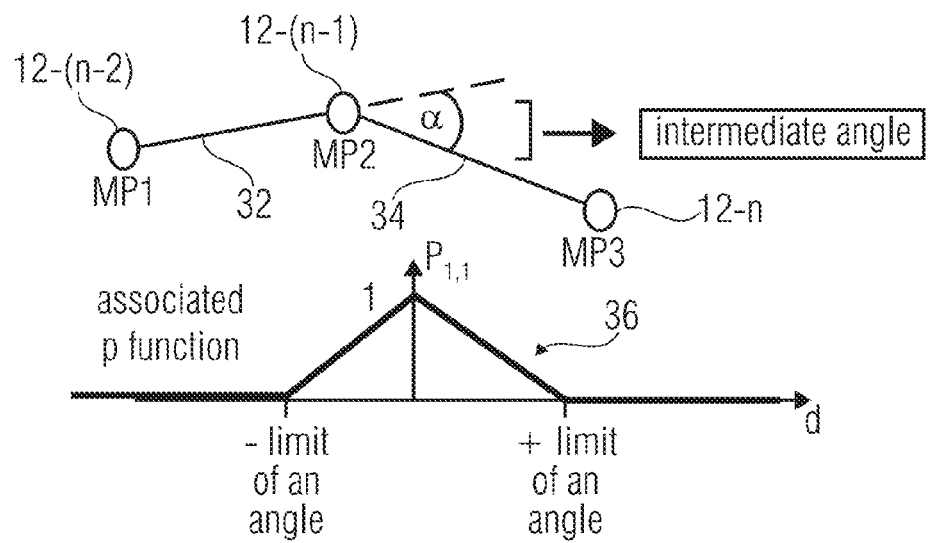
FIGS. 3A-3C are exemplary probability functions of partial probabilities for determining the first probability measure.

Determining a first allocation probability $P_{1,1}$ will be illustrated based on FIG. 3*a*.

FIG. 3*a* illustrates a current measurement point 12-$n$ and two adjacent previous measurement values 12-$(n-1)$ and 12-$(n-2)$. It is assumed that the two adjacent measurement values have already been allocated to the first map object 14-1, e.g. in the form of a road. Now, it has to be decided whether the current measurement value 12-$n$, i.e. the measurement value currently to be allocated to a map object, is also allocated to the first map object 14-1, or whether the same is allocated to a second, at least sectionally line-shaped map object 14-2 intersecting the first map object 14-1. This question arises, for example, in the case of intersecting roads or crossroads close to the current measurement point 12-$n$, but also in the case of other map objects modeled by polygons.

According to embodiments, the processor 22 is implemented to determine, for the current measurement value 12-$n$, the first allocation probability $P_{1,1}$ with respect to the first map object 14-1 such that the same depends on how heavily the current measurement value 12-$n$ deviates from a (best-fit) line 32 defined by the at least two previous measurement values 12-$(n-2)$, 12-$(n-1)$. Therefore, according to FIG. 3*a*, a line 34 can be placed through the current measurement value 12-$n$ and the previous measurement value 12-$(n-1)$, which intersects the line 32 at an angle $\alpha$. The smaller the angle $\alpha$ between the two lines 32 and 34, i.e. the smaller the deviation of the current measurement value 12-$n$ from the route predicted by the previous measurement values 12-$(n-2)$, 12-$(n-1)$, the higher the probability that the current measurement value 12-$n$, as well as the previous measurement values 12-$(n-2)$ and 12-$(n-1)$, can be allocated to the first, at least sectionally line-shaped map object 14-1. Here, merely exemplarily, only two adjacent measurement values 12-$(n-2)$, 12-$(n-1)$ are considered. A larger number of adjacent values is a design parameter and hence also possible.

This means that the smaller the intermediate angle $\alpha$ or the deviation from the line 32, the higher the first allocation probability $P_{1,1}$ will be. This is shown schematically by the exemplary probability function (p function) or probability density function 36. The first allocation probability $P_{1,1}$ can be plotted (as shown here) either directly against the intermediate angle $\alpha$, so that its value can be read directly. In the case of a probability density function, the first allocation probability $P_{1,1}$ can result by integrating a probability density across a possible range of angles. Determining the intermediate angle $\alpha$ obviously necessitates that coordinates of successive measurement values 12-$(n-2)$, 12-$(n-1)$, 12-$n$ differ from each other, i.e. that successive measurement values reflect continuous movement. Further, for determining the intermediate angle $\alpha$, only successive measurement values having a certain minimum distance from each other are to be used, since otherwise implausible results can occur. Therefore, according to embodiments, provisions can be made for detecting movement standstills or movements that are too slow with respect to the allocation of a current measurement value and for disregarding respective similar successive measurement values for the determination of the first allocation probability $P_{1,1}$ or for respectively considering the same.

It should be noted that the probability function 36 illustrated in FIG. 3*a* as well as the following probability functions are only to be seen exemplarily and hence can obviously also take a different course. They are to sketch merely in a qualitative manner how the individual allocation probabilities can be formed.

According to embodiments, the processor 22 is further implemented to determine, for the current measurement value 12-$n$, a second allocation probability $P_{1,2}$ with respect to the first map object 14-1, depending on how far the current measurement value 12-$n$ is away from the first map object 14-1. For that, a distance $d_2$ can be performed by orthogonal projection of the current measurement value 12-$n$, i.e. its coordinates to the line-shaped first map object 14-1. The distance $d_2$ between the measurement value projected onto the map object and the current measurement value 12-$n$ represents then the implied distance between the current measurement value 12-$n$ and the first map object 14-1. It is insignificant whether the distance $d_2$ is determined by using geographical longitude and latitude specifications or by means of Cartesian coordinates, for example.

Figure 3B:
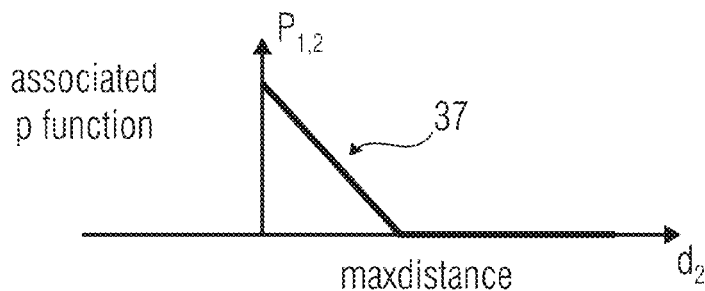
Figure 3C:
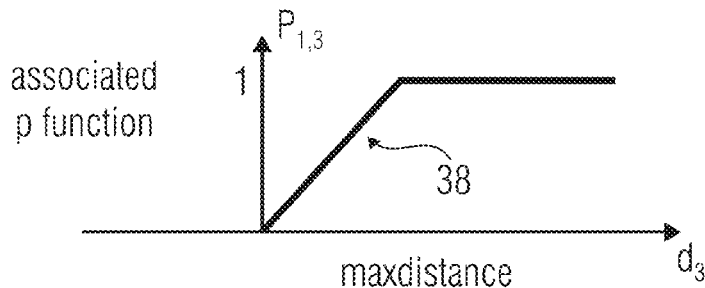

A possible probability function 37 with respect to the second allocation probability $P_{1,2}$ is shown exemplarily in FIG. 3*b*. Basically, it can be seen that the allocation probability $P_{1,2}$ is higher, the closer the current measurement value 12-$n$ is to the first map object 14-1 or the first road, to which also the last measurement values were allocated. Here, the actually used probability (density) function can again be different.

In embodiments of the present invention, the first probability measure $P_1$ is determined by including a further, third allocation probability $P_{1,3}$. For that, the processor 22 is implemented to determine, for the current measurement value 12-$n$, the third allocation probability $P_{1,3}$ with respect to the first map object 14-1 such that the same depends on how far the current measurement value 12-$n$ is away from the intersection 18 of the first map object 14-1 with the second map object 14-2. This distance will be referred to below as $d_3$. Thus, $d_3$ means, for example, the distance to the next possible street corner. The further the current measurement value 12-$n$ or its allocated geographical position is away from the intersection 18, the more unlikely it will be that the current measurement value 12-$n$ is to be allocated to the second map object 14-2. Vice versa, this means that the larger $d_3$, the more likely it will be that the current measurement value 12-$n$ is to be allocated to the first map object 14-1. This correlation is shown exemplarily based on the probability function 38 illustrated in FIG. 3c, which obviously could again be different.

From the three allocation probabilities $P_{1,1}$, $P_{1,2}$ and $P_{1,3}$, the first probability measure $P_1$ can be determined, for example according to $P_1=f(P_{1,1}, P_{1,2}, P_{1,3})=P_{1,1} \cdot P_{1,2} \cdot P_{1,3}$. Since each of the allocation probabilities lies between 0 and 1, the first probability measure $P_1$ will also lie between 0 and 1, i.e. $0 \leq P_1 \leq 1$. In the case of standstill detection, i.e. for the case that the current measurement point is very similar or equal to previous measurement points, for example $P_{1,1}=1$, could be chosen to disregard the first allocation probability $P_{1,1}$ that is unreliable in this case (since the intermediate angle $\alpha$ cannot be determined reliably).

When the first probability measure $P_1$ has been determined, the same can be compared with a first threshold $X_1$. If the first probability measure is above the first threshold (e.g. $X_1 \leq P_1$), then the current measurement value will be allocated to the first map object 14-1. This can be performed, for example, also by orthogonal projection of the measured coordinates to the line-shaped first map object 14-1. Obviously, other mapping regulations are also possible.

If the first probability measure $P_1$ lies below the first threshold value $X_1$ (e.g. $P_1 \leq X_1$), it has to be assumed that the current measurement value 12-$n$ is rather not to be allocated to the first map object, but to the second map object 14-2. In this case, for example, a change of roads from the first road to the second road (intersecting road) has taken place.

Figure 4:
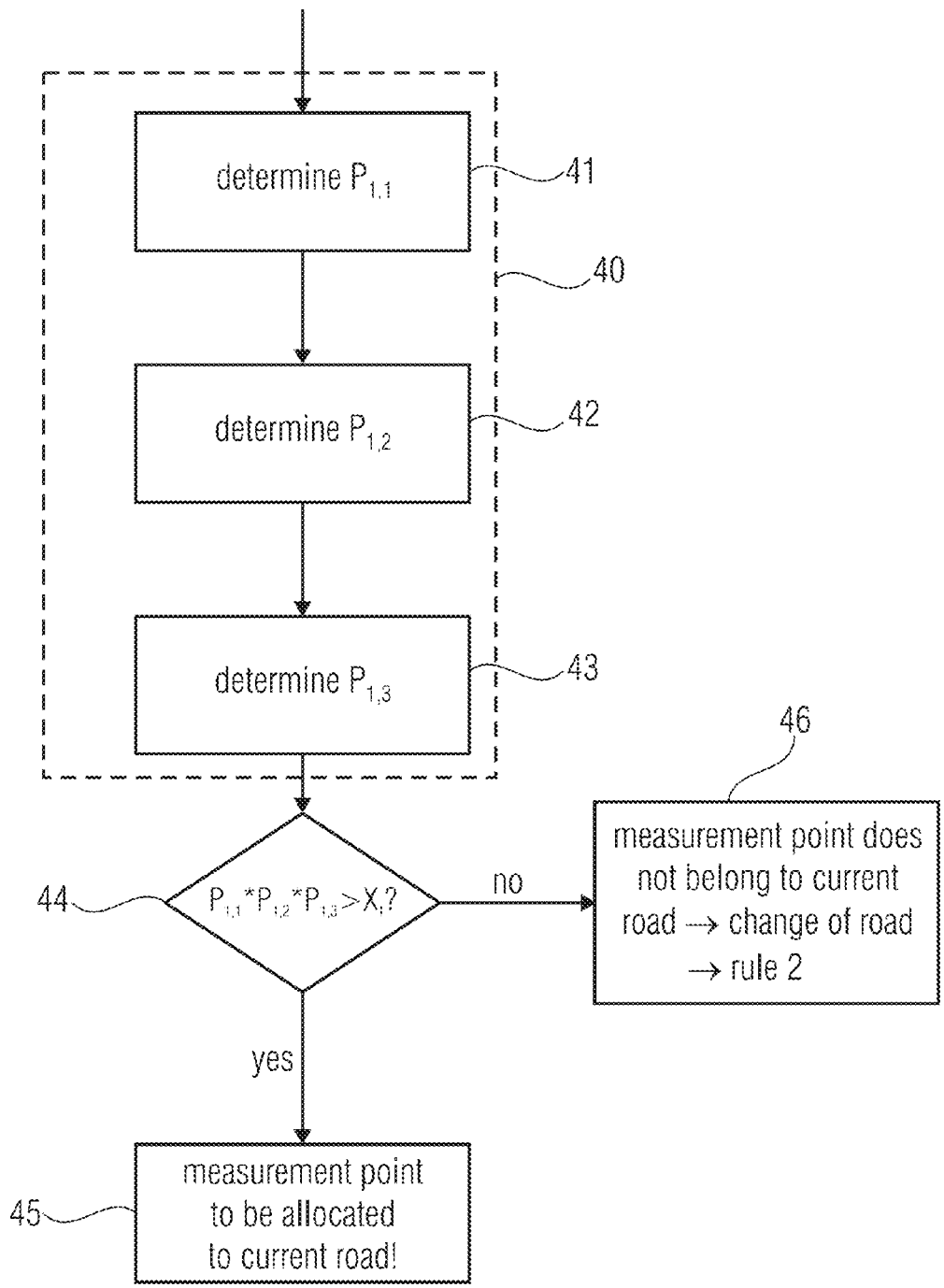
FIG. 4 is a schematic flow diagram of a method for determining the first probability measure.

Before it will be explained based on FIGS. 5 and 6 how the allocation of the current measurement value 12-$n$ to the second map object can be safeguarded as regards to probability, the rule for determining the first probability measure $P_1$ will again be summarized below based on FIG. 4.

In a step 40, the first probability measure $P_1$ is determined, which indicates whether the current measurement value 12-$n$ can be allocated to a first, at least sectionally line-shaped map object 14-1 to which at least one adjacent measurement value of the series has already been allocated previously. As has already been discussed above, step 40 can be divided into three sub-steps.

In a first sub-step 41, the first allocation probability $P_{1,1}$ will be determined, as explained above. In subsequent sub-steps 42, 43, the second and the third allocation probabilities $P_{1,2}$ and $P_{1,3}$ will be further determined, as has already been explained.

In a further step 44, the first probability measure $P_1$, composed of the three allocation probabilities $P_{1,1}$, $P_{1,2}$ and $P_{1,3}$ will be compared against the first threshold value $X_1$.

If the comparison 44 yields the result that the first probability measure $P_1$ is higher than the first threshold value $X_1$, the current measurement value 12-$n$ will be allocated, for example, to the current road, i.e. the first line-shaped map object 14-1 in a step 45.

If, however, the comparison 44 yields the result that the first probability measure $P_1$ is not sufficiently high, the current measurement value 12-$n$ will probably not belong to the first map object 14-1, but it will be checked whether the same can be allocated to the second map object 14-2 (step 46). This is performed by determining the second probability measure $P_2$, which will be discussed in more detail below.

Figure 5A:
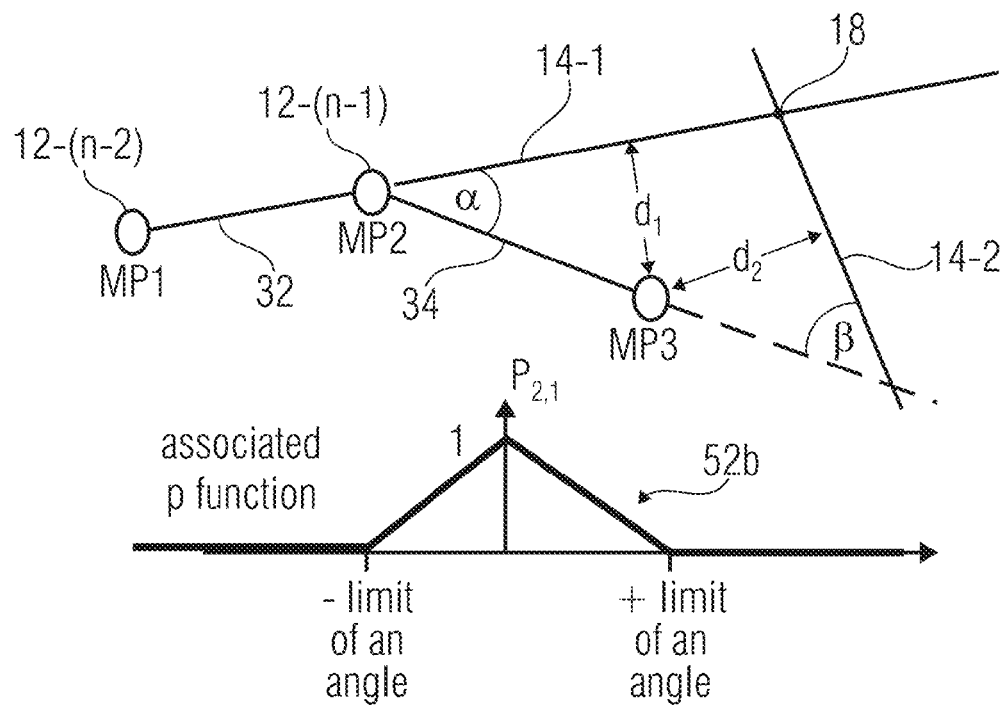
FIGS. 5A and 5B are examples of probability functions of partial probabilities for determining the second probability measure.

FIG. 5a shows an array of adjacent measurement points 12-($n$-2), 12-($n$-1), 12-$n$ like FIG. 3a.

According to embodiments, a fourth allocation probability $P_{2,1}$ with respect to the second map object 14-2 can be made conditional on an intermediate angle $\beta$ between the line 34 and the second, at least sectionally line-shaped map object 14-2. The smaller this intermediate angle $\beta$, the more "parallel" map object 14-2 and line 34 will be, and the higher the fourth allocation probability $P_{2,1}$ will be with respect to the allocation of the current measurement point to the second map object. This correlation is illustrated exemplarily by the schematic probability function 52b.

Further, the processor 22 can be implemented to determine, for the current measurement value 12-$n$, a fifth allocation probability $P_{2,2}$ with respect to the second map object 14-2 that can, for example, be dependent on how far the current measurement value 12-$n$ is away from the first map object 14-1 ($d_1$). In particular, the fifth allocation probability $P_{2,2}$ can be determined in this manner when the first map object 14-1 is cut by merely one second, at least sectionally line-shaped map object 14-2 within a radius of interest from the current measurement value 12-$n$. However, for several possible second, at least sectionally line-shaped map objects 14-2, this procedure does not provide any useful statements. A probability function 54a leading to the fifth allocation probability $P_{2,2}$ just described is shown schematically in FIG. 5b. From the probability function 54a it becomes clear that the fifth allocation probability $P_{2,2}$ is the higher, the greater the distance $d_1$ of the current measurement value from the first map object 14-1.

According to an embodiment, the processor 22 is implemented to determine, for the current measurement value 12-$n$, the fifth allocation probability $P_{2,2}$ with respect to the second map object 14-2, which depends on how far the current measurement value 12-$n$ is away from the second map object 14-2 ($d_2$). With respect to the above-described alternative, this is particularly advantageous with several possible second, at least sectionally line-shaped map objects 14-2. Correspondingly, the fifth allocation probability $P_{2,2}$ (reference number 54b) is the higher, the smaller the distance $d_2$ of the current measurement value 12-$n$ from the respective map object 14-2. A combination of the two above-described methods for determining $P_{2,2}$ is obviously also possible, so that $P_{2,2}$ is directly proportional to $d_1$ and simultaneously indirectly proportional to $d_2$.

According to embodiments of the present invention, the second probability measure $P_2$ is determined based on the fourth and fifth allocation probabilities, i.e. $P_2=f(P_{2,1}, P_{2,2})$. In particular, $P_2$ can be determined according to $P_2=P_{2,1} \cdot P_{2,2}$.

Since a road in the form of the first map object 14-1 generally does not only have one intersecting road (in the form of the second map object 14-2), but a plurality of those, the second probability measure $P_2$ is determined for each possible road intersecting the current road. Possible intersecting roads, i.e. second map objects, can be determined in a predetermined geographical radius around the current measurement position 12-1 depending on the measurement accuracy of the current measurement point to be expected. For the case that K second map objects are possible, K second probability measures $P_2^k$ (k=1, ..., K) are respectively determined, for each of the K second map objects. According to embodiments, the most likely second map object results from maximum value formation across the K second probability measures $P_2^k$ (k=1, ..., K). This means the $k^{th}$ second map object for which $maxP_2 = P_2^k = max(P_2^1, ... P_2^k)$ applies, is selected.

If the selected second probability measure $maxP_2$ is higher than a second threshold value $X_2$, it is assumed that the current measurement value 12-n is to be allocated to the selected second map object belonging to $maxP_2$. If, however, $maxP_2$ falls below the second threshold $X_2$, the first probability measure $P_1$ is considered again for the current measurement value 12-n. If the first probability measure $P_1$ is above a third threshold $X_3$ that is smaller than the first threshold $X_1$, the current measurement value 12-n will still be allocated to the first map object 14-1. If, however, the first probability measure $P_1$ lies below the third threshold $X_3$, it is assumed that something already "went wrong" during the allocation of the last measurement values 12-(n-1), 12-(n-2). In this case, placement or allocation of the current measurement value 12-n has to be performed again.

Figure 6:
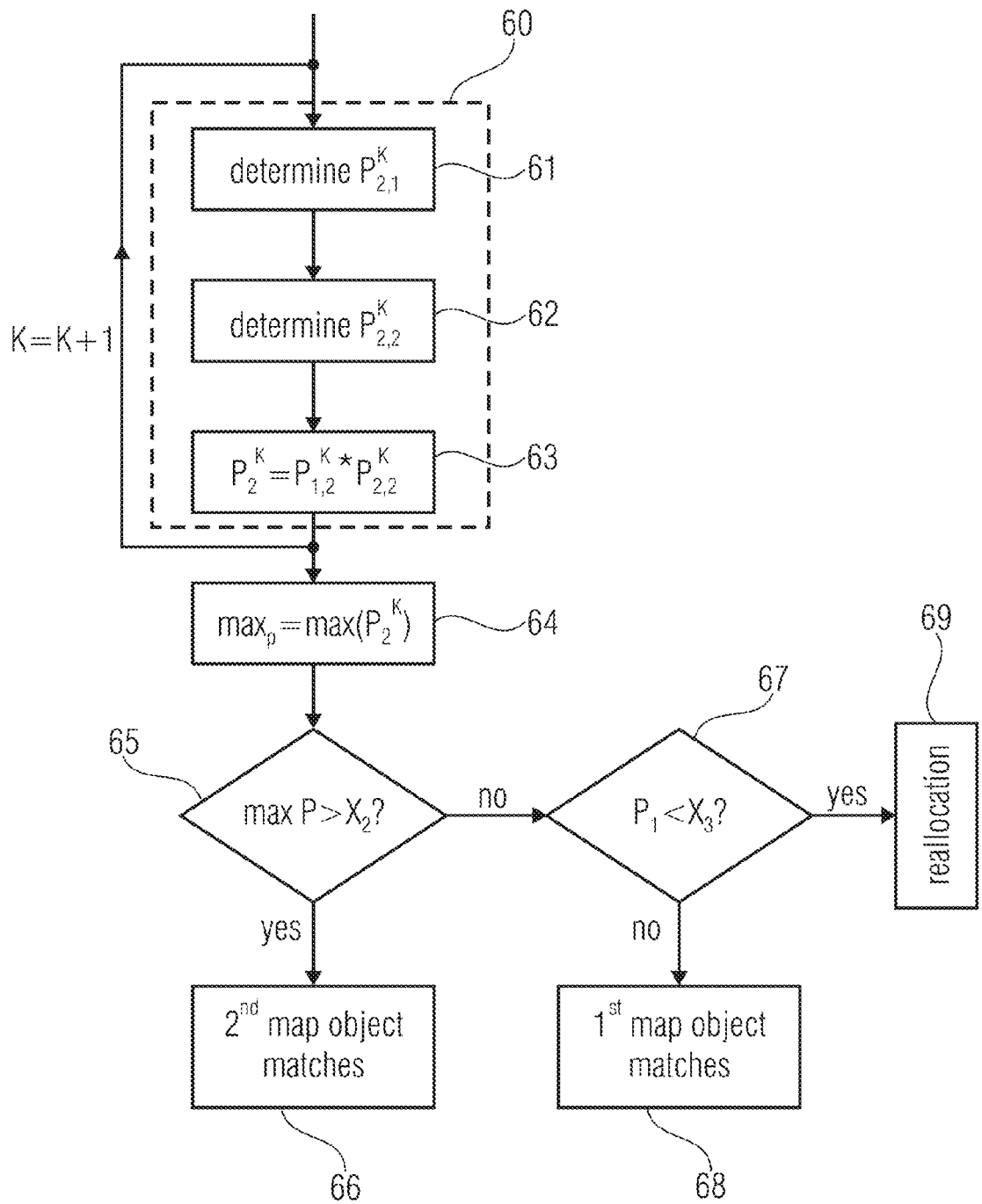
FIG. 6 is a schematic flow diagram of a method for determining the second probability measure according to an embodiment of the present invention.

Before this will discussed, the determination of the second probability measure $P_2$ will again be summarized based on FIG. 6.

FIG. 6 shows a step 60 of determining the second probability measure $P_2$ indicating whether the current measurement value 12-n can be allocated to the second, at least sectionally line-shaped map object 14-2 having an intersection 18 with the first map object 14-1, if the first probability measure $P_1$ indicates that an allocation of the current measurement value 12-n to the first map object 14-1 is unlikely.

As described above, step 60 can be performed for a plurality of possible second map objects, as indicated by the return path. Further, step 60 can be divided into sub-steps 61, 62 and 63. In a first sub-step 61, the first allocation probability $P_{2,1}^k$ is determined for each of the possible second map objects. According to embodiments, in sub-step 62, the fifth allocation probability $P_{2,2}^k$ is determined.

From the fourth and fifth allocation probability $P_{2,1}^k$, $P_{2,2}^k$, the second probability measure $P_2^k$ is calculated in the third sub-step 63. Steps 61, 62 and 63 are performed, as mentioned, for each possible second map object k (k=1, ... K), so that K second probability measures can be supplied to a step 64 for maximum value formation. If the maximum value $maxP_2$ is determined, the same will be compared to the second threshold $X_2$ in a step 65. If the maximum probability measure $maxP_2$ lies above the second threshold $X_2$, the current measurement value 12-n can be allocated to that of the second map object 14-2 to which $maxP_2$ belongs, in a step 66.

If, however, the maximum probability measure $maxP_2$ lies below the second threshold $X_2$, a consideration of the first probability measure $P_1$ is performed again for the current measurement value 12-n, wherein the first probability measure $P_1$ is compared to the third threshold $X_3 < X_1$. If this comparison 67 yields the result that the first probability measure $P_1$ lies above the third threshold $X_3$, the current measurement value 12-n can be allocated to the first map object 14-1 (step 68).

If the comparison 67 yields the result that the first probability measure $P_1$ lies below the third threshold $X_3$, the probability that an untrue statement was made during allocation of the last measurement values 12-(n-1), 12-(n-2) is high. In this case, according to embodiments, reallocation 69 takes place for the current measurement value 12-n. This reallocation 69 is to be described below.

Figure 7:
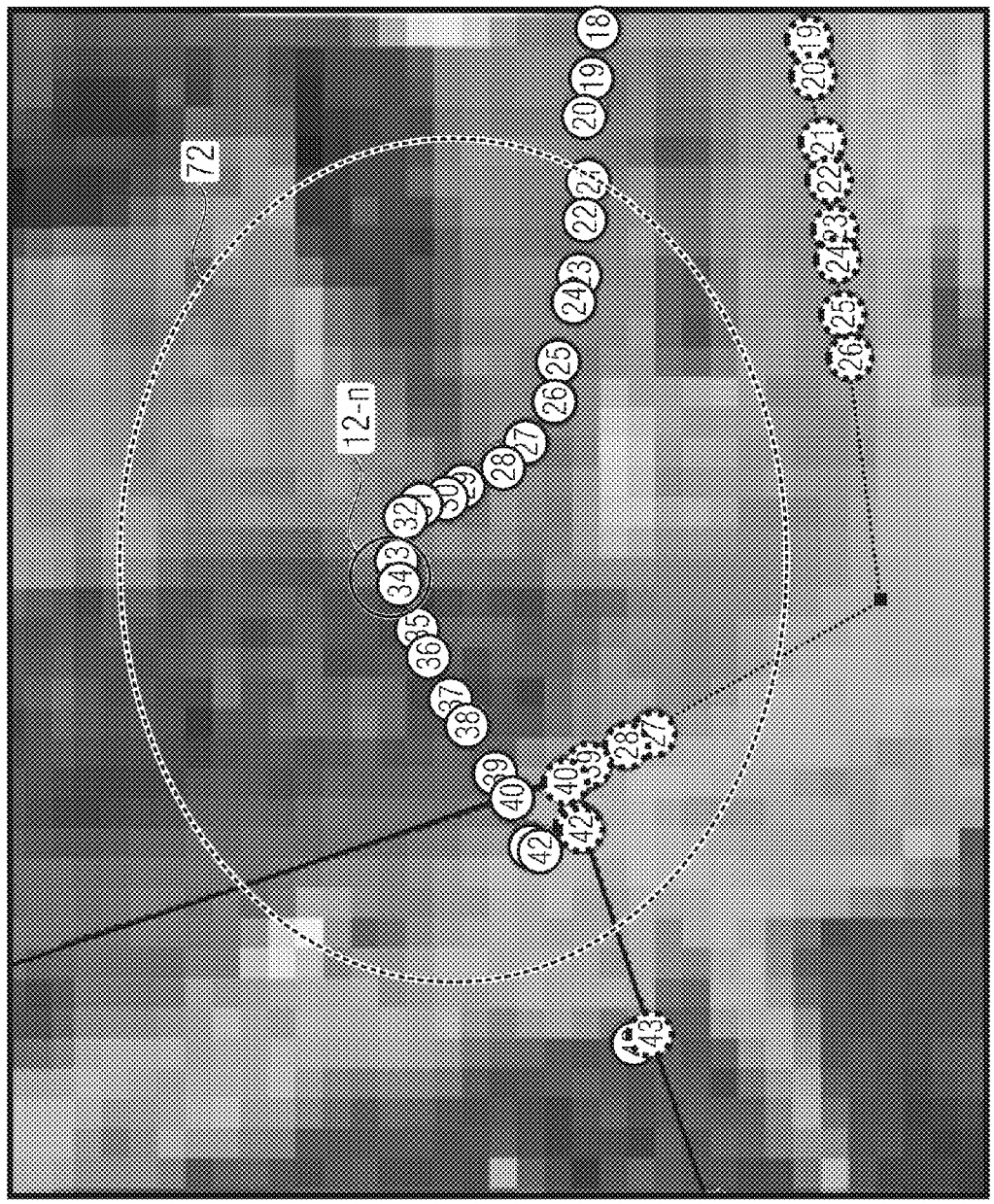
FIG. 7 is an illustration of a possibility of finding a correct map object when the previous allocation attempt has failed.

An option for reallocation is shown schematically in FIG. 7.

For the current measurement point 12-n, a vicinity search could be performed. For this, map objects (e.g. roads) could be searched in a predefined geographical vicinity 72 around the current measurement value 12-n. For this, the current measurement value 12-n could be mapped orthogonally to the respective road, for example to every road in the vicinity 72, in order to find out the distance to the respective road. The road to which the current measurement value 12-n has the smallest distance could be selected as the map object to which the current measurement value 12-n is allocated.

Figure 5B:
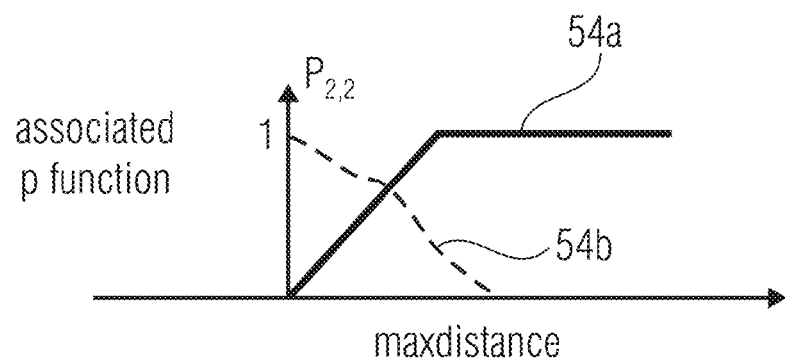

Then, for the reallocation of the current measurement value 12-n, a probability measure is determined corresponding to the second probability measure $P_2$, the calculation of which has already been discussed based on FIGS. 5a, 5b and 6. This means that the line 34 through the measurement values 12-n, 12-(n-1) is related to the sectionally line-shaped map object 14-2 to be reallocated, to which the current measurement value 12-n has the smallest distance, in that the intermediate angle β between the line 34 through the measurement values 12-n, 12-(n-1) and the map object to be reallocated is considered. The smaller this intermediate angle β, the more "parallel" the map object to be reallocated and the line will be and the higher the allocation probability $P_{2,1}$ will be with respect to the correct allocation of the current measurement point 12-n to the reallocated map object. As has already been described above, an allocation probability $P_{2,2}$ with respect to the reallocated map object can be determined for the current measurement value 12-n, which depends on how far the current measurement value 12-n is away from the map object to be reallocated. According to embodiments of the present invention, the probability measure $P_2$ for reallocation is determined based on the allocation probability $P_{2,1}$ and the allocation probability $P_{2,2}$, i.e. $P_2 = f(P_{2,1}, P_{2,2})$. In particular, $P_2$ can be determined according to $P_2 = P_{2,1} \cdot P_{2,2}$.

The concept presented here can be used, for example, both for real-time and virtually real-time navigation and for subsequently matching a route driven or walked along to geographical reference data (map data). In this way, embodiments of the present invention can display which route has been taken through a city, a building or the like.

Embodiments of the present invention can also be applied for improving reference data to be used for a WLAN-based localization or navigation system. At the beginning it has already been described that reference data in the form of reference measurement packets having HF fingerprints for geographical reference positions have to be determined for WLAN-based navigation systems. The WLAN-based localization systems considered here use the received signal strength (RSS) fingerprinting as a basic method. This method is based on the assumption that signal strengths of radio signals of several radio stations received or receivable by the current location unambiguously characterize the current location or the current position. If a reference database exists containing, for a number of reference locations or reference positions, transmitter identifications of radio stations received or receivable there at reference points, and the signal strengths of the corresponding radio signals, the current position can be inferred from a set of current measurement values (transmitter identifications and associated signal strength values) by matching currently measured measurement values and the reference values of the database. This matching evaluates for every reference point how similar its previously recorded measurement or reference values are to the current measurement values of the current position. The most similar reference point(s) is/are then used as a basis for an estimated value for the current location of the mobile terminal device.

The signal strength of a radio transmitter receivable at a reference position at a reference measuring time is determined experimentally for a reference database by a reference measurement. The result is a database that contains a list of radio transmitters (access points) including the respective associated received field strength and quality for every reference position where a reference measurement has been performed. This list may also be referred to as reference packet. With a WLAN implementation, such a reference database may exemplarily contain the following parameters:

The column PGS ("Percentage Seen") indicates how frequently this station was seen on a percentage basis when taking the measuring values (i.e. PGS=90 means that the station was measured on average in 9 out of 10 measurements).

In the table illustrated above, all the information associated with a reference position identification (RID) corresponds to a reference measurement packet. This means that the above exemplary table includes three reference measurement packets corresponding to three different geographical reference positions.

When localizing, currently received radio transmitters including their respective associated received field strengths

| RID | MAC | RSSI | PGS | X | Y | Z | MAPNR | CREATED |
|---|---|---|---|---|---|---|---|---|
| 1 | 00.0D.54.9E.17.81 | 46530 | 100 | 5795 | 15627 | 150 | 0 | 12.03.07 12:42 |
| 1 | 00.0D.54.9E.1A.BA | 67260 | 90 | 5795 | 15627 | 150 | 0 | 12.03.07 12:42 |
| 1 | 00.0D.54.9E.1D.64 | 72002 | 88 | 5795 | 15627 | 150 | 0 | 12.03.07 12:42 |
| 1 | 00.0E.6A.D3.B9.8B | 59531 | 100 | 5795 | 15627 | 150 | 0 | 12.03.07 12:42 |
| 1 | 00.0F.A3.10.07.6C | 46464 | 96 | 5795 | 15627 | 150 | 0 | 12.03.07 12:42 |
| 1 | 00.0F.A3.10.07.FB | 74488 | 94 | 5795 | 15627 | 150 | 0 | 12.03.07 12:42 |
| 1 | 00.0F.A3.10.09.SF | 72375 | 97 | 5795 | 15627 | 150 | 0 | 12.03.07 12:42 |
| 2 | 00.0D.54.9E.17.81 | 54138 | 100 | 14399 | 15451 | 150 | 0 | 12.03.07 12:43 |
| 2 | 00.0D.54.9E.18.1D | 76560 | 11 | 14399 | 15451 | 150 | 0 | 12.03.07 12:43 |
| 2 | 00.0D.54.9E.1A.BA | 62318 | 94 | 14399 | 15451 | 150 | 0 | 12.03.07 12:43 |
| 2 | 00.0D.54.9E.1D.64 | 71348 | 96 | 14399 | 15451 | 150 | 0 | 12.03.07 12:43 |
| 2 | 00.0E.6A.D3.B9.8B | 45393 | 100 | 14399 | 15451 | 150 | 0 | 12.03.07 12:43 |
| 2 | 00.0F.A3.10.07.6C | 66853 | 96 | 14399 | 15451 | 150 | 0 | 12.03.07 12:43 |
| 2 | 00.0F.A3.10.07.FB | 72251 | 100 | 14399 | 15451 | 150 | 0 | 12.03.07 12:43 |
| 2 | 00.0F.A3.10.09.5F | 70990 | 90 | 14399 | 15451 | 150 | 0 | 12.03.07 12:43 |
| 3 | 00.0D.54.9E.17.81 | 58291 | 100 | 24583 | 15627 | 150 | 0 | 12.03.07 12:43 |
| 3 | 00.0D.54.9E.18.1D | 78610 | 68 | 24583 | 15627 | 150 | 0 | 12.03.07 12:43 |
| 3 | 00.0D.54.9E.1A.BA | 62153 | 98 | 24583 | 15627 | 150 | 0 | 12.03.07 12:43 |
| 3 | 00.0D.54.9E.1D.64 | 64187 | 90 | 24583 | 15627 | 150 | 0 | 12.03.07 12:43 |
| 3 | 00.0E.6A.D3.B9.8B | 32851 | 100 | 24583 | 15627 | 150 | 0 | 12.03.07 12:43 |
| 3 | 00.0F.A3.10.07.6C | 69006 | 96 | 24583 | 15627 | 150 | 0 | 12.03.07 12:43 |
| 3 | 00.0F.A3.10.07.FB | 71749 | 92 | 24583 | 15627 | 150 | 0 | 12.03.07 12:43 |
| 3 | 00.0F.A3.10.09.5F | 71482 | 83 | 24583 | 15627 | 150 | 0 | 12.03.07 12:43 |
| 3 | 00.0F.A3.10.09.80 | 71000 | 40 | 24583 | 15627 | 150 | 0 | 12.03.07 12:43 |

The table contains the following information:
reference position identification (RID),
MAC addresses of the stations received,
received field strengths of the radio transmitters (RSSI (Received Signal Strength Indicator); 46560 means −46.560 dBm),
reference position in Cartesian metric coordinates (x, y, z; 24583 means 245.83 m), and
time of taking the measuring value.

(measurement packet) are compared to reference packets from the reference database in a matching phase. Reference packets of smaller a distance to the current measurement packet, i.e. many common radio transmitters and few differing received field strengths, fit the current measurement packet well. The reference positions belonging to the well-fitting reference packets are very probable and are considered in a position-calculating phase. From the reference position, the position calculation phase calculates the position of he mobile terminal device. An estimated value for the position of the terminal device is the result of this phase. The quality of the estimated value depends, among others, on the quality of the reference packets, in particular the reference positions.

The reference positions are determined, for example by GPS receivers. As has also been described, such GPS receivers are only accurate to a limited extent. By the described concept, the recorded reference positions of the stored measurement packets can be subsequently corrected and allocated to map objects, so that the accuracy of the stored reference positions in the database can be significantly increased.

Thus, embodiments of the present invention provide a concept for improving reference data having measured coordinates of a geographical reference position and a reference measurement packet allocated to the measured coordinates, which has a reference transmitter identification determined at the geographical reference position and an electromagnetic signal characteristic of a radio transmitter receivable at the reference position at a reference time. Therefore, the measured coordinates corresponding only inaccurately to the actual coordinates of the geographical reference position are matched to coordinates of map objects of a geographical map that are in the vicinity of the measured coordinates, to obtain improved coordinates corresponding better to the actual coordinates of the geographical reference position than the measured coordinates. Subsequently, the improved coordinates are allocated to the reference measurement packet.

Figure 8:
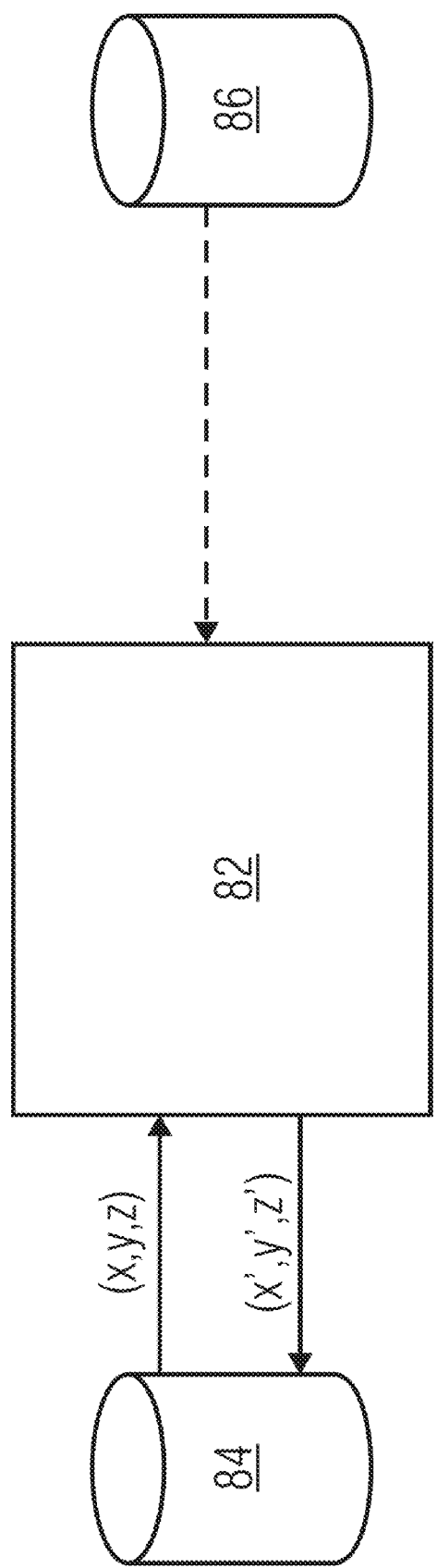
FIG. 8 is an apparatus for improving reference data according to an embodiment of the present invention.

Regarding this, FIG. 8 shows a processor 82 coupled to a database 84 to be able to receive reference measurement packets, in particular coordinates (x,y,z) of a geographical reference position, from the database 84.

Thus, the processor 82 comprising, according to embodiments, the above-described processor 22 is adjusted to match the measured coordinates (x,y,z) only inaccurately corresponding to coordinates of the geographical reference position to coordinates of map objects 14 of a geographical map that are in the vicinity of the measured coordinates, to obtain improved coordinates (x',y',z') corresponding better to the actual coordinates of the geographical reference position than the measured coordinates, and to allocate the improved coordinates (x',y',z') to the reference measurement packet or to replace the measured coordinates (x,y,z) by the improved coordinates (x',y',z').

Digital map data corresponding to the map objects can, for example, be obtained from a map database 86. For this, the processor 82 can be coupled to the map database 86, as indicated in FIG. 8.

The map objects in the vicinity of the measured coordinates (x,y,z) can, for example, be determined by a vicinity search around the measured coordinates. Obviously, the radius of the vicinity depends on the respective application and the measurement accuracy and can, for example, be less than 100 m, but in particular less than 30 m.

The electromagnetic characteristics of the radio signals are signal characteristics related to a received field strength, such as received field strength, received power spectrum, signal-to-noise ratio (SNR), angle of incidence, runtime, polarization or phase position of the radio signals. The reference transmitter identification consists, for example, of MAC addresses of the radio transmitters receivable at the reference position.

Thus, reference positions where allocated reference measurement packets, i.e. radio fingerprints of receivable WLAN transmitters, are recorded can be measured in a relatively inaccurate manner. The measurement takes place, for example, by driving or walking along any routes and by recording the measurement packets at intervals along these routes. For example, a measurement packet could be recorded every two to 30 seconds, depending on the application, and stored in the database 84. For driving or walking, for example, professional drivers (e.g. taxi drivers, bus drivers, etc.) or postmen or bicycle messengers could be used, i.e. people moving anyway on a daily basis within a certain area, for which reference data are to be recorded. This allows relatively uncomplicated and cost-effective generation of the reference database 84.

Subsequently, the processor 82 can match the measured reference positions to highly accurate map data corresponding to the routes driven or walked along by post-processing (map matching) using the presented method. For this, the processor merely needs access to the database 84 where the reference measurement packets are stored together with the measured reference positions. Also, access to respective highly accurate map material is necessitated, so that the subsequent matching can take place. For this, the map data can also be retrieved from appropriate map databases 86. For this, the processor 82 can have an appropriate interface, such as an Internet interface for retrieving map data from external databases 86. The reference database 84 can also be coupleable to the processor 82 by means of such an interface.

Via the interface, the measured coordinates (x,y,z) of reference positions of the measurement packets stored in the database 84 can be received. Based on the received coordinates, an evaluation can be made as to the geographical area in which the measured coordinates (x,y,z) are located. This enables the processor 82 to request geographical map material from the map database 86 based on the measured coordinates coupled to the same. Such map databases 86 are numerous and frequently available at no cost. The map data of the (digital) map database 86 comprise highly accurate geographical coordinates of the map objects, such as roads, paths or buildings. For that reason, it is possible to match the measured coordinates by means of the inventive concept to the highly accurate map data by the map matching described herein. This matching of the measured coordinates (x,y,z) with the highly accurate map data is performed for every measured position of a reference measurement packet. After map matching has been performed, the improved coordinates (x',y',z') of the reference positions can be written back into the database 84. The old measured coordinates (x,y,z) of a reference measurement packet are replaced by the new improved coordinates (x',y',z').

Thus, embodiments of the present invention can help to provide a highly accurate reference database for fingerprint-based localization systems, such as WLAN-based localization systems. Thereby, position accuracy in a calibration process does not have to be highly accurate, so that complicated and expensive GPS receiving devices are not necessitated. The accuracy of the measured reference positions is obtained with subsequent post-processing by matching the measured positions to highly accurate map data. Thus, embodiments provide an option for post-processing measured geographical positions used as reference positions for WLAN-based localization or navigation devices. By the described post-processing, the quality of the measured geographical positions can be significantly improved and hence also the quality of the position information obtained by radio fingerprint matching in a WLAN-based system. There, finally, currently determined radio fingerprints are compared with stored radio fingerprints at the reference positions, and based thereon an estimated value for a current geographical position is determined with the aid of reference positions.

Finally, it should be noted that the inventive methods could be implemented in hardware or in software, depending on the circumstances. Implementation can be made on a digital memory medium, in particular a disc, CD or DVD having electronically readable control signals that can cooperate with a programmable computer system such that the inventive method is performed. Hence, generally, the invention also consists of a computer program product having a program code stored on a machine-readable carrier for performing the inventive method when the computer program product runs on a computer and/or microcontroller. In other words, the invention can be realized as a computer program having a program code for performing the method for allocating a current measurement value when the computer program runs on a computer and/or a microcontroller.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An apparatus for improving reference data stored in a reference data base, comprising measured coordinates of a geographical reference position and a reference measurement packet allocated to the reference position, which comprises a reference transmitter identification determined at the geographical reference position and electromagnetic signal characteristics of a radio transmitter receivable at the reference position at a reference time, comprising:
 a processor implemented to match the measured coordinates approximating actual coordinates of the geographical reference position to coordinates of map objects of a geographical map to acquire improved coordinates more closely corresponding to the actual coordinates of the geographical reference position than the measured coordinates, and to replace, in the reference measurement packet stored in the reference data base, the measured coordinates of the geographical reference position by the improved coordinates; wherein
 the reference data base is used in determining a current geographical position by comparing a currently measured one of the electromagnetic signal characteristic of the radio transmitter to one of the electromagnetic signal characteristics of the radio transmitter in the reference measurement packet.

2. The apparatus according to claim 1, wherein the electromagnetic signal characteristics are signal characteristics of radio signals related to a received field strength.

3. The apparatus according to claim 1, wherein the electromagnetic signal characteristics include one of a Received Signal Strength Indicator value, a received power spectrum, or a signal-to-noise ratio.

4. The apparatus according to claim 1, wherein the coordinates of the map objects correspond to actual coordinates of landscape objects allocated to the map objects.

5. The apparatus according to claim 1, wherein the map objects represent roads, paths or buildings.

6. A hardware implemented method for improving reference data stored in a reference data base, comprising measured coordinates of a geographical reference position and a reference measurement packet allocated to the reference position, which comprises a reference transmitter identification determined at the geographical reference position and electromagnetic signal characteristics of a radio transmitter receivable at the reference position at a reference time, comprising:
 matching the measured coordinates approximating actual coordinates of the geographical reference position to coordinates of map objects of a geographical map to acquire improved coordinates more closely corresponding to the actual coordinates of the geographical reference position than the measured coordinates; and
 replacing the measured coordinates of the geographical reference position by the improved coordinates in the reference measurement packet stored in the reference data base; wherein
 the reference data base is used in determining a current geographical position by comparing a currently measured one of the electromagnetic signal characteristic of the radio transmitter to one of the electromagnetic signal characteristics of the radio transmitter in the reference measurement packet.

7. A tangible storage medium having stored thereon a computer program for performing the method of improving reference data stored in a reference data base, comprising measured coordinates of a geographical reference position and a reference measurement packet allocated to the reference position, which comprises a reference transmitter identification determined at the geographical reference position and electromagnetic signal characteristics of a radio transmitter receivable at the reference position at a reference time, the method comprising:
 matching the measured coordinates approximating actual coordinates of the geographical reference position to coordinates of map objects of a geographical map to acquire improved coordinates more closely corresponding to the actual coordinates of the geographical reference position than the measured coordinates; and
 replacing the measured coordinates of the geographical reference position by the improved coordinates in the reference measurement packet stored in the reference data base when the computer program runs on a computer or a microcontroller; wherein
 the reference data base is used in determining a current geographical position by comparing a currently measured one of the electromagnetic signal characteristic of the radio transmitter to one of the electromagnetic signal characteristics of the radio transmitter in the reference measurement packet.

* * * * *